US010826905B2

(12) United States Patent
Gujarathi

(10) Patent No.: US 10,826,905 B2
(45) Date of Patent: Nov. 3, 2020

(54) SECURE ACCESS TO ON-PREMISES WEB SERVICES FROM MULTI-TENANT CLOUD SERVICES

(71) Applicant: Citrix Systems, Inc., Fort Lauderdale, FL (US)

(72) Inventor: Ashish Gujarathi, Parkland, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 441 days.

(21) Appl. No.: 15/368,876

(22) Filed: Dec. 5, 2016

(65) Prior Publication Data
US 2018/0159856 A1 Jun. 7, 2018

(51) Int. Cl.
| | | |
|---|---|---|
| *H04L 29/06* | (2006.01) | |
| *H04L 29/08* | (2006.01) | |
| *H04L 9/00* | (2006.01) | |
| *H04L 29/12* | (2006.01) | |

(52) U.S. Cl.
CPC .......... *H04L 63/10* (2013.01); *H04L 9/006* (2013.01); *H04L 63/0281* (2013.01); *H04L 63/0823* (2013.01); *H04L 63/168* (2013.01); *H04L 67/02* (2013.01); *H04L 67/10* (2013.01); *H04L 67/16* (2013.01); *H04L 67/2838* (2013.01); *H04L 61/1511* (2013.01); *H04L 67/42* (2013.01)

(58) Field of Classification Search
CPC ..... H04L 63/10; H04L 9/006; H04L 63/0281; H04L 63/0823; H04L 63/168; H04L 67/02; H04L 67/10; H04L 67/16; H04L 67/2838
See application file for complete search history.

(56) References Cited

U.S. PATENT DOCUMENTS

| | | | | |
|---|---|---|---|---|
| 9,313,024 B1* | 4/2016 | Stute | .................. | H04L 9/08 |
| 2007/0083610 A1* | 4/2007 | Treder | .................. | H04L 67/34 |
| | | | | 709/217 |
| 2011/0276661 A1* | 11/2011 | Gujarathi | .............. | G06F 9/452 |
| | | | | 709/219 |
| 2013/0104044 A1* | 4/2013 | Gujarathi | .............. | G06F 9/452 |
| | | | | 715/733 |
| 2013/0174275 A1* | 7/2013 | Micucci | ................ | H04W 4/21 |
| | | | | 726/28 |

(Continued)

OTHER PUBLICATIONS

Feb. 15, 2018 (WO) Interntional Search Report and Written Opinion—App. PCT/US2017/064313.

*Primary Examiner* — Yonas A Bayou
(74) *Attorney, Agent, or Firm* — Banner & Witcoff, Ltd.

(57) ABSTRACT

Methods, systems, and computer-readable media for using a multi-tenant web relay service to provide secure access to on-premises web services from a tenant-specific cloud service are described herein. In one or more embodiments, a multi-tenant web relay service may receive from a tenant-specific cloud service a connection request to an on-premises web service hosted within a tenant datacenter. The connection request may comprise data indicating a display-friendly name of the web service and the tenant datacenter. Responsive to receiving the request, the web relay service may forward the connection request to the on-premises web service via a rendezvous support service and a web relay agent. Responsive to receiving the connection request, the on-premises web service may generate a response which may be relayed back to the tenant-specific cloud service by the multi-tenant web relay service.

21 Claims, 10 Drawing Sheets

(56) References Cited

U.S. PATENT DOCUMENTS

| | | | |
|---|---|---|---|
| 2013/0212497 A1* | 8/2013 | Zelenko | H04L 43/04 715/760 |
| 2013/0218948 A1* | 8/2013 | Jakobson | G06Q 30/0641 709/203 |
| 2013/0218949 A1* | 8/2013 | Jakobson | G06Q 50/01 709/203 |
| 2013/0218966 A1* | 8/2013 | Jakobson | G06Q 30/0241 709/204 |
| 2014/0007192 A1* | 1/2014 | Qureshi | G06F 8/53 726/3 |
| 2014/0068737 A1* | 3/2014 | Micucci | H04L 63/08 726/7 |
| 2014/0108775 A1* | 4/2014 | Kludy | G06F 9/45558 713/2 |
| 2014/0344459 A1* | 11/2014 | Kludy | H04L 41/0893 709/226 |
| 2016/0241596 A1 | 8/2016 | Overby, Jr. et al. | |

* cited by examiner

SECURE ACCESS TO ON-PREMISES WEB SERVICES FROM MULTI-TENANT CLOUD SERVICES

FIELD

Aspects described herein generally relate to computer hardware and software, networking, and security measures in place therein. In particular, one or more aspects of the disclosure generally relate to computer hardware and software for providing secure access to on-premises web services from a multi-tenant cloud service.

BACKGROUND

Many enterprises (e.g., corporations, partnerships, governments, academic institutions, other organizations, etc.) are now using virtualization and clouds of computing resources to help fulfill their information technology and computing needs. Cloud service providers (CSPs) can deliver cloud-based computing services (e.g., Infrastructure-as-a-Service (IaaS), Platform-as-a-Service (PaaS), Software-as-a-Service (SaaS), and storage services) by hosting desktops and applications for their customers or tenants. A multi-tenant cloud service is a cloud-based computing environment in which the resources of the computing environment are allocated and shared amongst the subscribing tenant organizations, while providing different levels of isolation between the resources allocated to the tenants. Tenant organizations may find it advantageous to integrate their own on-premises web services with the services provided by the cloud-based computing services. For example, some tenants may integrate their application storefront web service to provide a unified application store to their end-users. Such integration, while improving usability of the cloud-based services for end users, may require the cloud-based computing services to directly access an internal or private web service within the tenant's private network. Such a scenario may create a large potential risk for a security breach of the tenant's internal network.

Information security is of paramount importance in providing cloud services to one or more tenant organizations. As a result, tenant organizations have typically addressed these security concerns with the use of a site-to-site Internet Protocol Security (IPsec) tunnel between the tenant's datacenter and the cloud-based service. However, these approaches have not been without their share of problems. For example, unless properly configured, the IPsec tunnel may provide full access to all of the tenant's internal network resources and not just the specific resources that the tenant wishes to share with the cloud service. Additionally, the configuration process is typically a manual and error-prone process requiring a tenant administrator to deploy or configure components in a demilitarized zone (DMZ) or other perimeter network, allocate permanent and publicly-accessible Internet Protocol (IP) addresses to those components, and make significant changes to firewall configurations to allow inbound access from the cloud service. Furthermore, the tunnel, firewall, and DMZ configuration tends to be a fragile component, which may be easily and inadvertently changed by a network administrator, resulting in a potential outage for the tenant. Finally, these approaches typically require the cloud service to store private and confidential information about the tenant's IT infrastructure, like access credentials, private or internal IP addresses or Fully-Qualified Domain Names (FQDN). Tenant organizations may be hesitant to share this information with a publicly-accessible cloud service which may allow an unintended recipient to gain access to this information.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, methods, and techniques for providing secure access to on-premises web services from multi-tenant cloud services with a multi-tenant web relay service. In particular, aspects described herein may be used to provide a generic proxy that may allow cloud services to access enterprise resources without a requirement to open any inbound ports or use of a site-to-site Internet Protocol Security (IPsec) tunnel. Aspects of the disclosure described in greater detail below may be used to configure a cloud service to securely connect with an on-premises web services hosted within a tenant datacenter without having to configure the cloud service with credentials needed to access the on-premises web services or provide to the cloud service network addresses of the on-premises web services.

In accordance with one or more aspects, a method may comprise receiving, by a multi-tenant web relay service may receive, and from a tenant-specific cloud service, a request to connect to an on-premises web service hosted within a tenant datacenter. The request may comprise a Hypertext Transfer Protocol (HTTP) request. The request may comprise credential information which the multi-tenant web relay service may use to authenticate the request. The request may further comprise data indicating a display-friendly name of the on-premises web services and the tenant datacenter. Subsequent to receiving the request to connect, the multi-tenant web relay service may establish, via a rendezvous support service, a communication channel with a web relay agent, wherein the web relay agent is located at the tenant datacenter indicated in the request. The multi-tenant web relay service may forward, to the web relay agent, the request to connect via the communication channel. Subsequent to receiving the request to connect, and caused by the multi-tenant web relay service, the web relay agent may access the on-premises web service based on the display-friendly name of the on-premises web service comprised by the request. The multi-tenant web relay service may receive, from the web relay agent, a response to the request. The multi-tenant web relay service may relay the received response to the tenant-specific cloud service.

In some arrangements, the on-premises web service may comprise an on-premises Public Key Infrastructure (PKI) service and the response to the request may comprise an end-user certificate. In other arrangements, the on-premises web service may comprise an enterprise storefront service and the response to the request may comprise a listing indicative of applications available on the enterprise storefront service.

In some embodiments, the request to connect may comprise authenticating credentials for a user of the tenant-specific cloud service and causing the web relay agent to access the web service may comprise causing the web relay agent to authenticate to the on-premises web service using only the authenticating credentials for the user.

In other embodiments, the request to connect may comprise a partial address relative to a base address of the on-premises web service and causing the web relay agent to access the web service may comprise: causing the web relay agent to determine the base address to the on-premises web service using only the display-friendly name of the web service; and causing the web relay agent to determine a full address to the on-premises web service using only the base address to the on-premises web service and the partial address relative to the base address of the on-premises web service.

In yet other embodiments, causing the web relay agent to access the web service may comprise: causing the web relay agent to determine a service-account credential using only the display-friendly name of the web service; and causing the web relay agent to authenticate to the web service with the service-account credential.

Systems and non-transitory computer readable media may be configured to provide and/or support various aspects described herein. These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards systems, methods, and techniques for providing secure access to on-premises web services from multi-tenant cloud services with a multi-tenant web relay service. In particular, aspects described herein may be used to provide a generic proxy that may allow cloud services to access enterprise resources without requiring any inbound ports to be opened and without requiring a site-to-site Internet Protocol Security (IPsec) tunnel to be used.

Before discussing these concepts in greater detail, several examples of computing architecture and systems that may be used in implementing and/or otherwise providing various aspects of the disclosure will first be discussed with respect to FIGS. 1-6.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
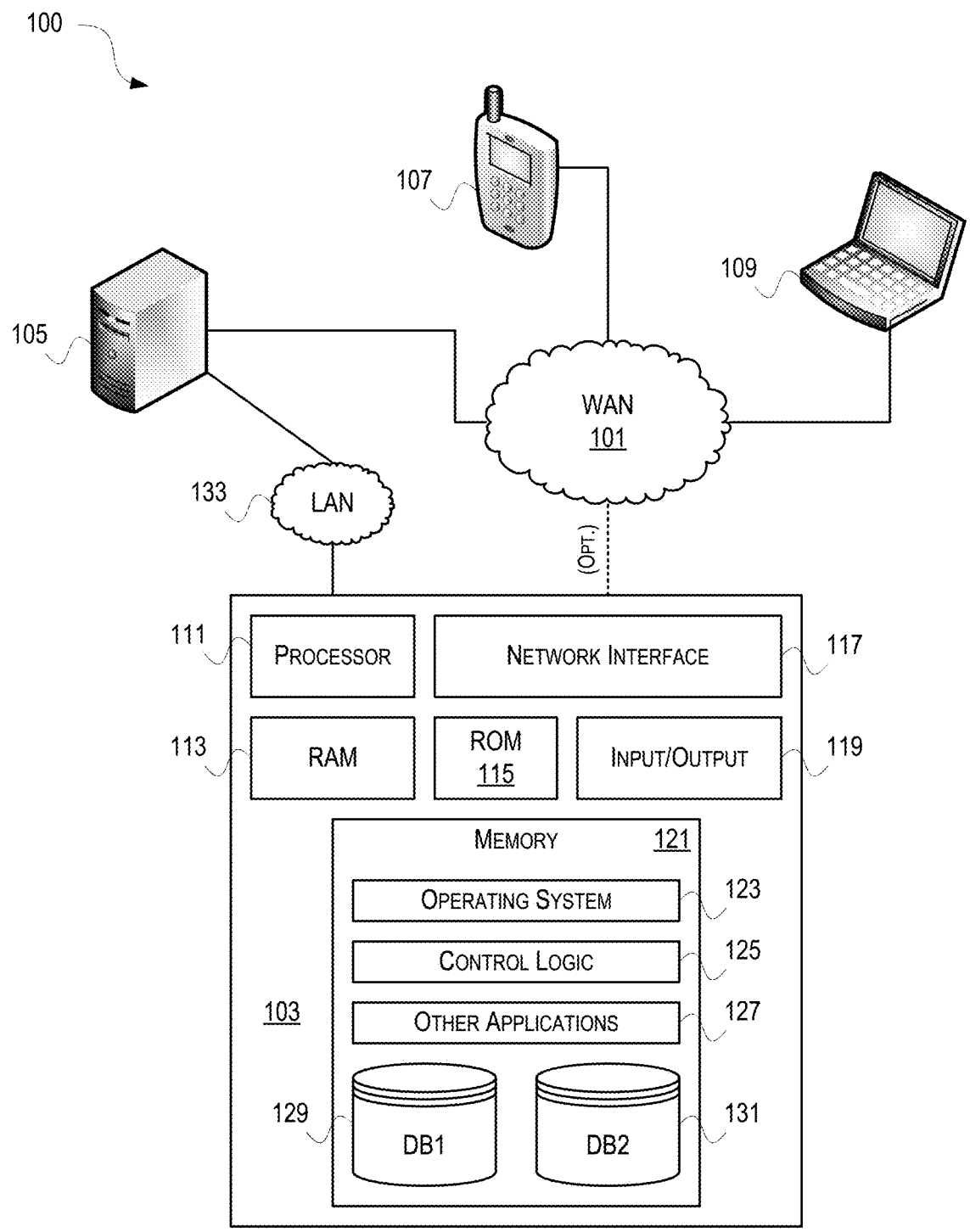
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
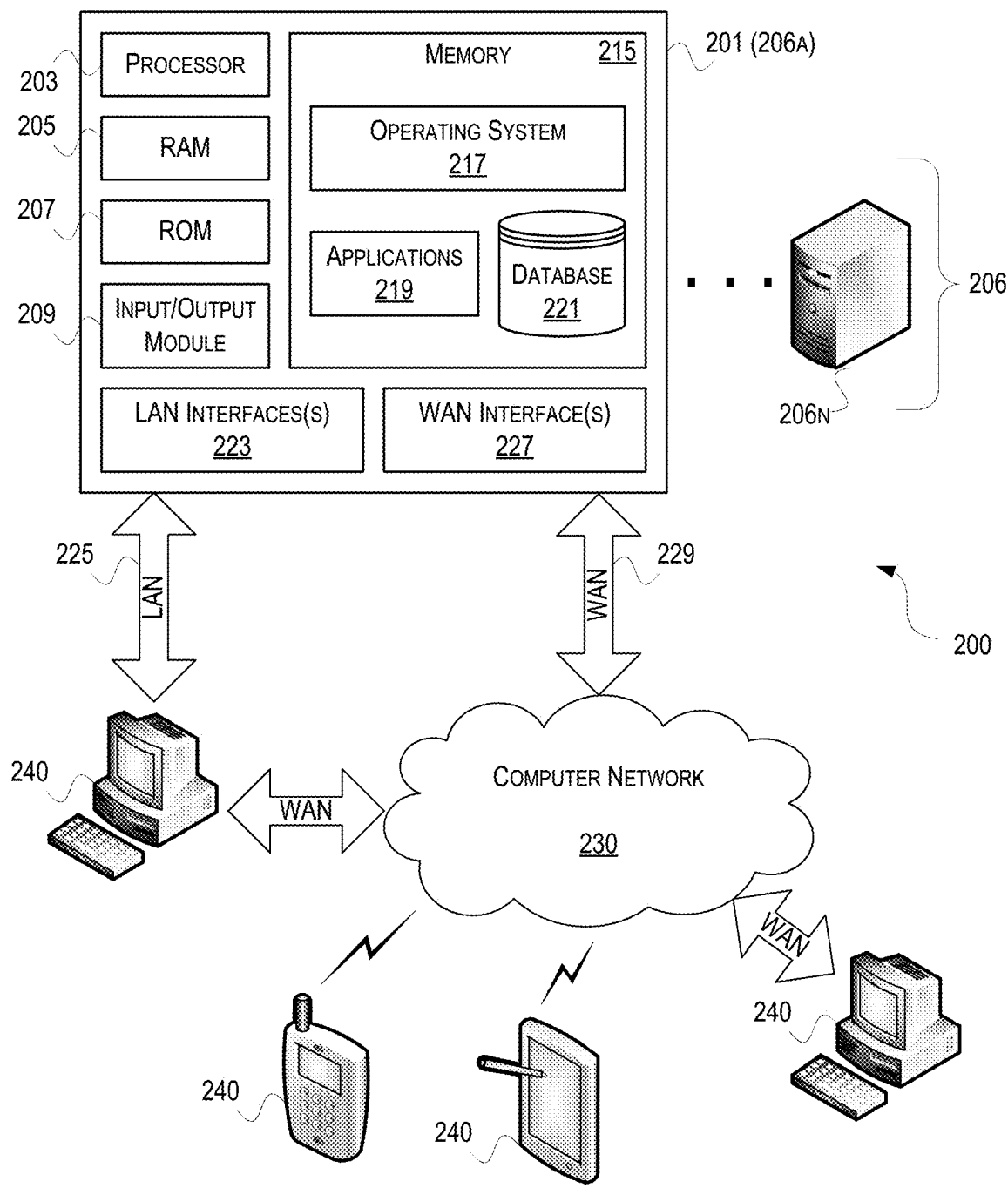
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, Input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
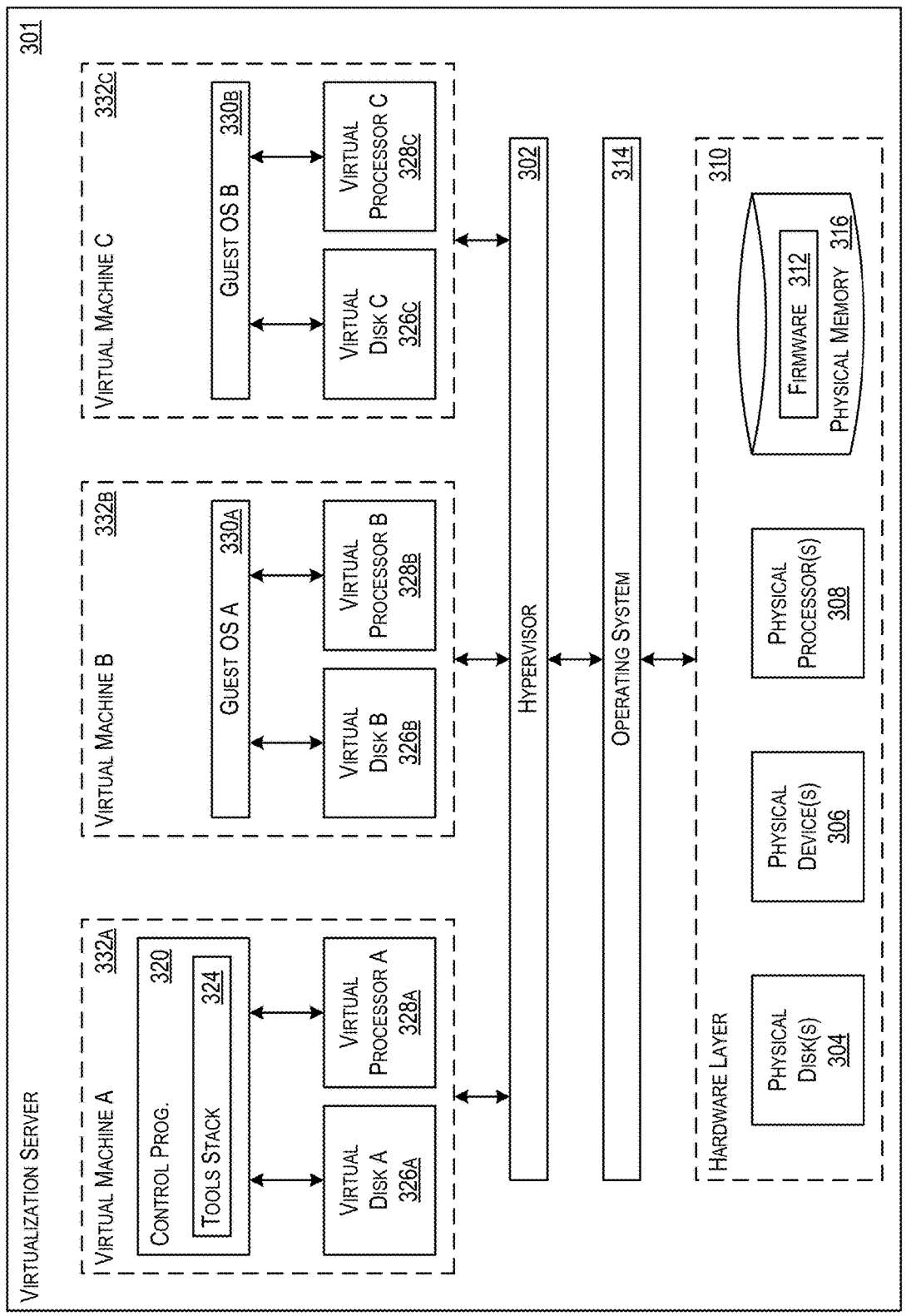
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332a-332c (generally 332). Each virtual machine 332 may have a virtual disk 326a-326c and a virtual processor 328a-328c. In some embodiments, a first virtual machine 332a may execute, using a virtual processor 328a, a control program 320 that includes a tools stack 324. Control program 320 may be referred to as a control virtual machine, Dom0, Domain 0, or other virtual machine used for system administration and/or control. In some embodiments, one or more virtual machines 332b-332c can execute, using a virtual processor 328b-328c, a guest operating system 330a-330b.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332b-332c (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326a-326c (generally 326) and a virtual processor 328a-328c (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
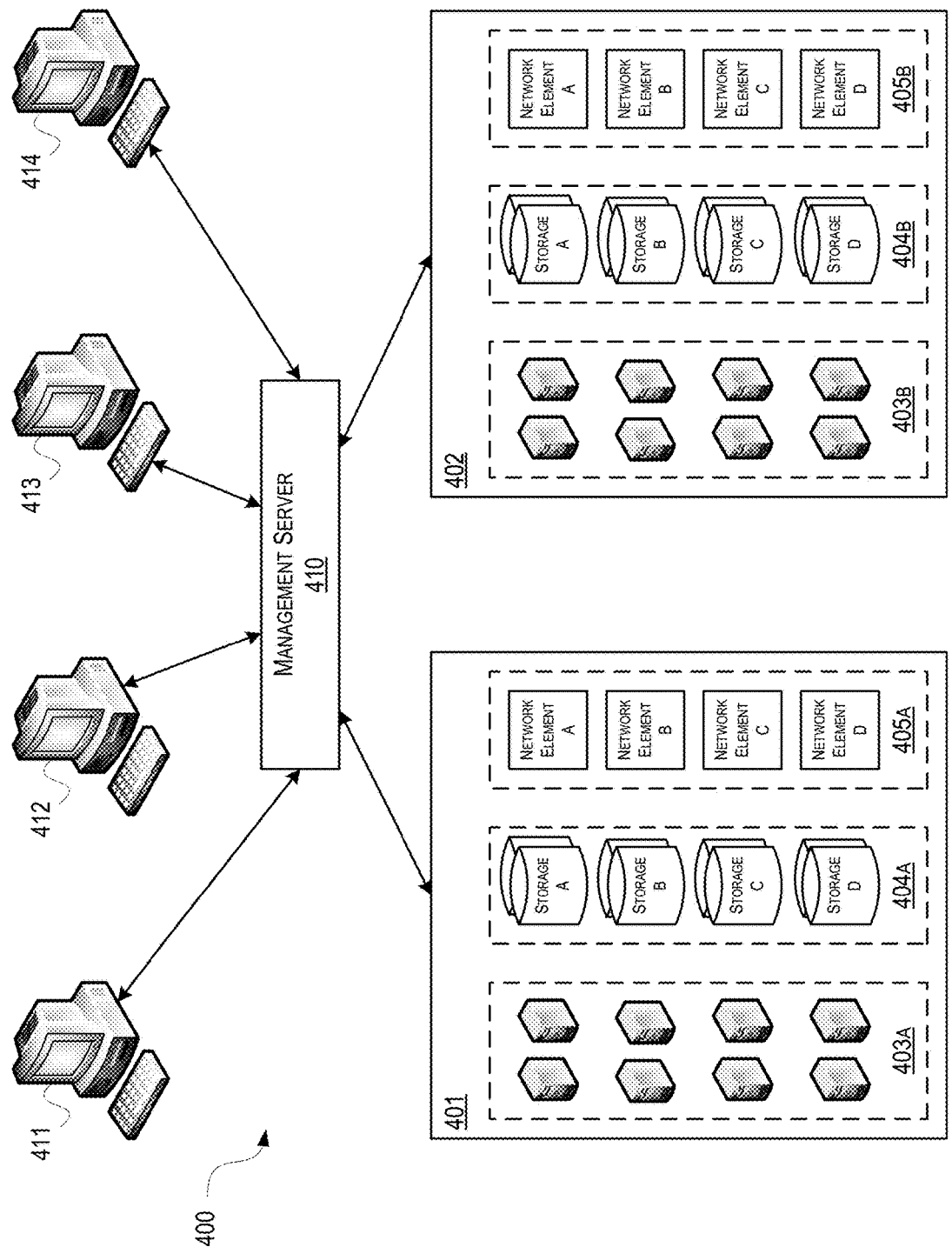
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
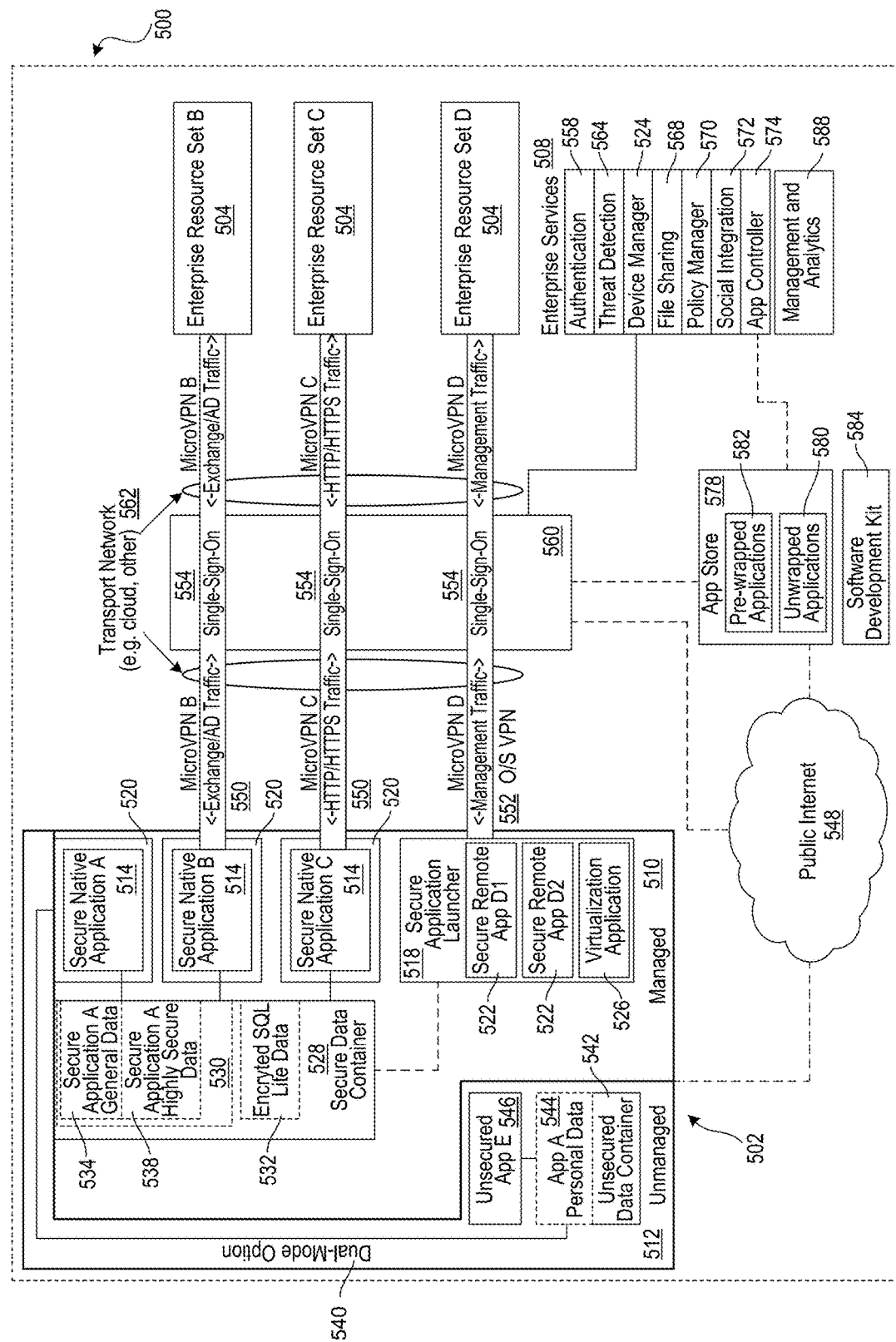
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is impenetrable by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications 550, particular devices, particular secured areas on the mobile device 552, and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
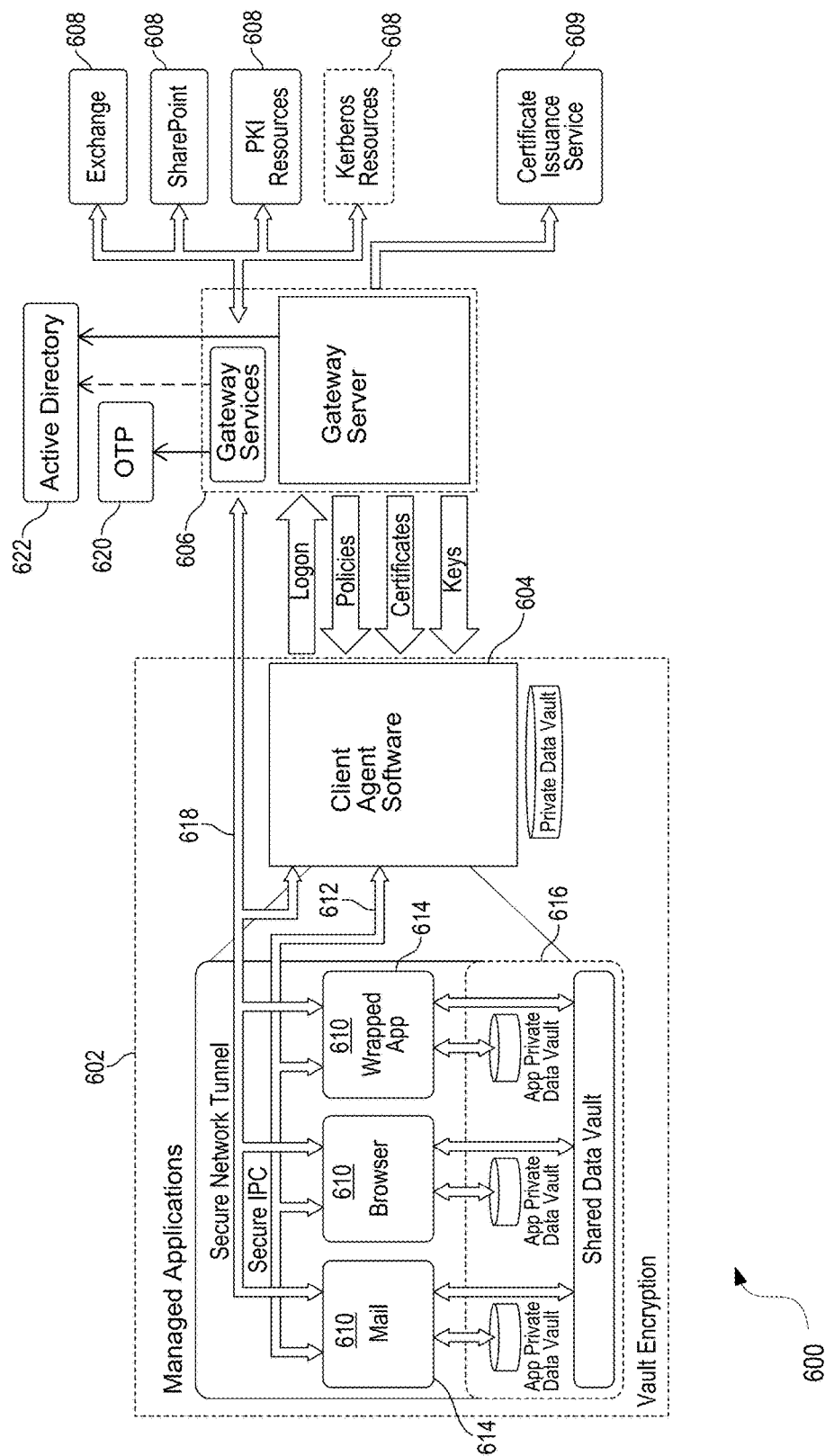
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g., transaction log) or for temporary data encryption.

Illustrative Embodiments

Having discussed several examples of the computing architecture that may be used in providing and/or implementing various aspects of the disclosure, a number of embodiments will now be discussed in greater detail. In particular, and as introduced above, some aspects of the disclosure generally relate to providing secure access to on-premises web services from multi-tenant cloud services with a multi-tenant web relay service. In the description below, various examples illustrating how a tenant-specific cloud service may obtain secure access to an on-premises web service hosted within a tenant datacenter using a multi-tenant web relay service in accordance with one or more embodiments will be discussed.

Figure 7:
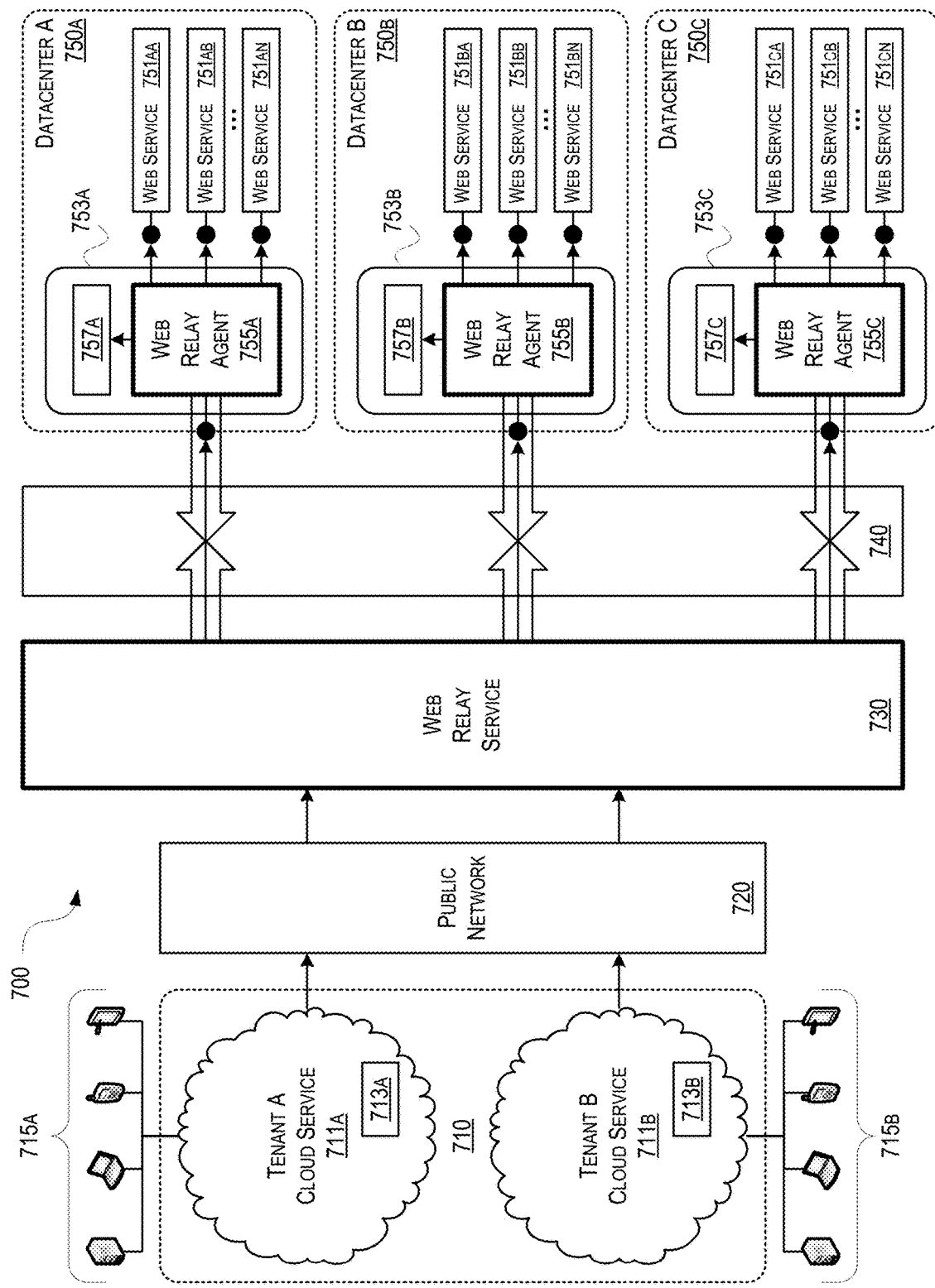
FIG. 7 depicts an illustrative system architecture which may be used for providing secure access to on-premises web services from multi-tenant cloud services, according to one or more illustrative aspects described herein.

FIG. 7 depicts an illustrative system architecture which may be used for providing secure access to on-premises web services from multi-tenant cloud services. As seen in FIG. 7, tenant-specific cloud services 711a-711b (generally 711) may communicate with multi-tenant web relay service 730 via a public network 720 to access the web services 751aa-751cn (generally 751) which are hosted within a datacenter of the tenant (e.g., 750a-750c.) The architecture of the computing system 700 depicted in FIG. 7 is similar in many respects to and may incorporate one or more aspects of the architecture of the cloud computing environments 300 and 400, described above with reference to FIGS. 3 and 4, and enterprise mobility management systems 500 and 600, described above with reference to FIGS. 5 and 6. Computing system 700 may include additional features not mentioned above in reference to FIGS. 3-6. Some of the components of the cloud computing environments 300 and 400 and enterprise mobility management systems 500 and 600 have been omitted from FIG. 7, and the corresponding description, for the sake of simplicity.

The computing environment 700 may include one or more tenants. For example, computing environment 700 may include one or more tenant-specific cloud services, such as tenant A cloud service 711a (which may, e.g., be a first enterprise and which may be subscribed to the software services provided by a cloud service provider 710), and tenant B cloud service 711b (which may, e.g., be a second enterprise different from the first enterprise and which may be subscribed to the same software services as tenant A 711a or may alternatively be subscribed to other software services provided by the cloud service provider 710.) Tenant A may include one or more enterprise users that may be allowed to connect to the tenant A cloud service 711a via one or more client devices 715a. Similarly, tenant B may include one or more enterprise users that may be allowed to connect to the tenant B cloud service 711b via one or more client devices 715b. Client devices 715a and 715b may be any type of computing device capable of receiving and processing input via one or more user interfaces, providing output via one or more user interfaces and communicating input, output, and/or other information to and/or from one or more other computing devices. For example, client devices 715a and 715b may be a server computer, a desktop computer, a laptop computer, a tablet computer, a smart phone, or the like. In addition, the client devices 715a and 715b may be one of the computing devices described above in reference to FIGS. 1, 2, and 4-6 (e.g., devices 103, 105, 107, 109, 240, 411-414, 502, and 602.) Client devices 715a and 715b may connect with their corresponding tenant-specific cloud service 711 via the Internet or some other communication network. Although FIG. 7 illustrates two tenant-specific cloud services 711 (i.e., 711a and 711b), computing environment 700 may, in some arrangements, comprise any number of tenant-specific cloud services 711.

A tenant-specific cloud service 711 may be configured to provide one or more cloud-based services to the client devices 715 associated with the corresponding tenant. In some embodiments, some of the cloud-based services provided by a tenant-specific cloud service 711 may comprise cloud-based services provided by the cloud service provider 710 hosting the one or more tenant-specific cloud services 711 (e.g., 711a and 711b.) For example, tenant A cloud service 711a may comprise a plurality of applications which are provided by the cloud service provider 710 and which are made available to client devices 715a via an application storefront. In other embodiments, some of the cloud-based services provided by a tenant-specific cloud service 711 may comprise web-services hosted by the subscribing tenant and from within the internal network of the tenant (e.g., datacenters 750a-750c.) For example, tenant A cloud service 711a may augment the applications available via the application storefront by accessing a web service 751 (e.g., web services 751aa-751cn) which may publish additional applications that may be accessed by client devices 715a. In such a scenario, client devices 715a may seamlessly access applications hosted by cloud service provider 710 and by tenant A from within a single application storefront.

Each one of the tenant-specific cloud services 711 may comprise tenant-specific information 713 corresponding to the tenant associated with the tenant-specific cloud service. For example, tenant A cloud service 711a may comprise tenant-specific information 713a comprising information corresponding to tenant A. Similarly, tenant B cloud service 711b may comprise tenant-specific information 713b comprising information corresponding to tenant B. The tenant-specific information 713 may comprise a network address for web relay service 730 which the tenant-specific cloud service 711 may use to communicate with one or more of the web services 751. In some embodiments, the network address for web relay service 730 may be specific to each tenant. For example, the network address used by tenant A, and stored in tenant-specific information 713a may be different from the network address used by tenant B, and stored in tenant-specific information 713b. In other embodiments, both tenant-specific information 713a and tenant-specific information 713b may comprise the same network address. In such an example, tenant A and tenant B may be prevented from communicating with datacenters associated with the other tenant (e.g., tenant A may be prevented from communicating with tenant B's datacenters, and tenant B may be prevented from communicating with tenant A's datacenters.) In some instances, the network address for web relay service 730 comprised by tenant-specific information 713 may comprise a uniform record locator (URL) address. Alternatively or additionally, the network address may comprise a fully-qualified domain name (FQDN). The network address may also comprise an Internet Protocol (IP) address.

In addition to the network address for web relay service 730, the tenant-specific information 713 may also comprise credential information for authenticating to the web relay service 730. The credential information for authenticating to the web relay service 730 may be different from credential information that may be required for authentication by on-premises web services 751. Advantageously, a tenant-specific cloud service 711 might not store or maintain internal and private credential information for accessing on-premises web services 751 with cloud service provider 710. Authentication between the tenant-specific cloud service 711 and the web relay service 730 may be effectuated using one or more of known authentication mechanisms. The tenant-specific information 713 may comprise credential information needed by the authentication mechanisms used between the tenant-specific cloud service 711 and the web relay service 730. For example, a tenant-specific cloud service 711 may use a username and password combination to authenticate with a web relay service 730. In such a scenario, the tenant-specific information 713 for the tenant-specific cloud service 711 may comprise a tenant-specific username and password. In another example, a tenant-specific cloud service 711 may generate a signature using a per-tenant private key, which may be validated by a web relay service 730 using a corresponding public key. In this scenario, the tenant-specific information 713 for the tenant-specific cloud service 711 may comprise a tenant-specific private key.

Figure 8:
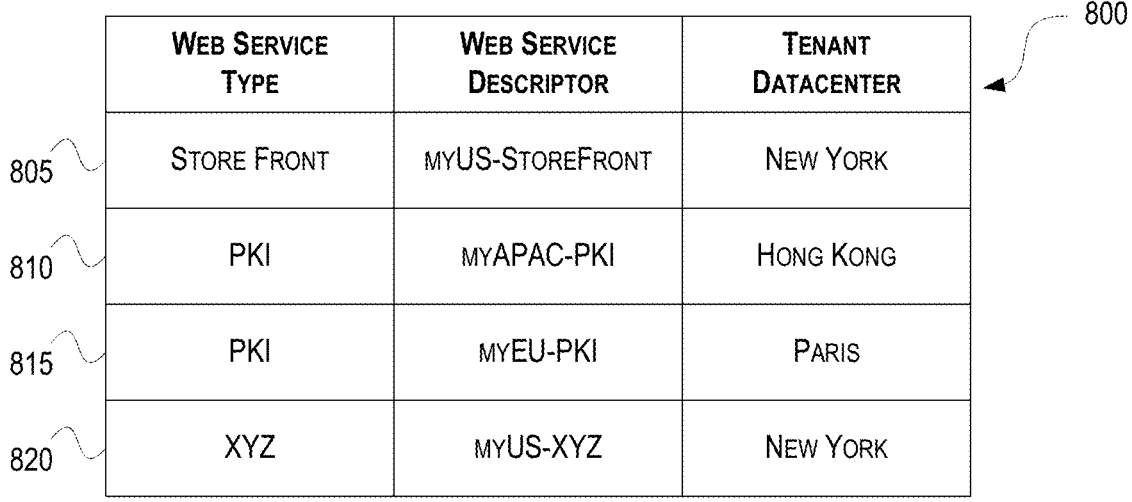
FIG. 8 depicts exemplary mapping information that may be used in accordance with one or more illustrative aspects described herein.

The tenant-specific information 713 may further comprise mapping information that the tenant-specific cloud service 711 may use to correlate a web service descriptor to a tenant datacenter in which the web service resides, as shown in FIG. 8. FIG. 8 illustrates exemplary mapping information 800 which a tenant-specific cloud service 711 may be configured to use to determine a tenant datacenter with which to establish a connection to communicate with a particular web service. For example, mapping information 805 may describe a storefront web service which is hosted within a tenant's New York datacenter. In addition, the storefront web service may be identified using the myUS-StoreFront descriptor. The web service descriptor may be a display-friendly name that may be used to refer to a specific instance of an on-premises web service. For example, the web service descriptor may include a display-friendly name, such as a human-readable word or combination of words or a phrase that may describe the on-premises web service. In the example above, the myUS-StoreFront descriptor may be used to describe a storefront type of web service hosted by a datacenter geographically located in the United States. Advantageously, the web service descriptor may be used in lieu of using a network address (e.g., IP address, FQDN, URL address, or the like) to identify the on-premises web service. In another example, mapping information 810 may describe a public-key infrastructure (PKI) web service named myAPAC-PKI which resides in the Hong Kong datacenter. In yet another example, mapping information 815 may describe another PKI web service named myEU-PKI which resides in the Paris datacenter. In another example, mapping information 820 may describe another type of web service named myUS-XYZ which is hosted in the New York datacenter. Although FIG. 8 illustrates four mapping information entries (i.e., 805-820), mapping information 800 may, in some instances, comprise any number of mapping information entries. An administrator, or similarly authorized user in the tenant organization, may configure a tenant-specific web service 711 to comprise mapping information similar to mapping information 800, and via a cloud service administration console, or the like.

Referring to FIG. 7, a tenant-specific cloud service 711 may communicate with web services 751 via a multi-tenant web relay service 730. Rather than establishing a site-to-site Internet Protocol Security (IPsec) tunnel with each one of the one or more datacenters belonging to a tenant, the tenant-specific cloud service 711 may transmit a request to communicate with a particular web service 751 (e.g., 751aa-751cn) located a particular datacenter (e.g., 750a-750c) to a web relay service 730. In some embodiments, tenant-specific cloud service 711 may determine the particular datacenter 750 with which to establish a connection based on a number of factors, including, but not limited to, geographic location, load-balancing considerations, or other performance-related measurements. For example, tenant-specific cloud service 711 may determine to connect with a PKI web service located in a Hong Kong datacenter if or when a client device 715 consuming the cloud service is geographically located near the Hong Kong datacenter. Alternatively or additionally, tenant-specific cloud service 711 may determine to connect with a PKI web service located in a Paris datacenter if or when another client device 715 consuming the cloud service is geographically located near the Paris datacenter. In another example, tenant-specific cloud service 711 may determine to connect with a particular web service from a plurality of similar web services on a round-robin fashion or some other mechanism for balancing load across the plurality of similar web services. In yet another example, tenant-specific cloud service 711 may determine to connect with a particular web service based on a determination of one or more performance level indicators (e.g., processor load, input/output throughput, count of active connections, etc.)

The connection request from the tenant-specific cloud service 711 to the multi-tenant web relay service 730 may comprise credential information from tenant-specific information 713 for authenticating to the web relay service 730. In some embodiments, the connection request may comprise a HyperText Transfer Protocol (HTTP) request. In such embodiments, the connection request may comprise a HTTP header with credential information (e.g., username and password, or signature using a per-tenant private key) which the web relay service 730 may use to authenticate the tenant-specific cloud service 711 transmitting the request. The connection request may also comprise the name of the particular datacenter 750 where the particular web service 751 is hosted. The tenant-specific cloud service 711 may determine the name of the particular datacenter 750 using the mapping information 800 stored in the tenant-specific information 713. For example, a HTTP connection request may comprise a HTTP header with the name of the datacenter. The connection request may also comprise the web service descriptor for the particular web service 751. The tenant-specific cloud service 711 may determine the web service descriptor for the particular web service 751 using the mapping information 800 stored in the tenant-specific information 713. The connection request may also comprise a command or action or request from the tenant-specific cloud service 711 to be performed by the particular web service 751. In some instances, the command or action may be indicated as part of a destination address for the connection request. For example, a HTTP connection request may comprise a destination address comprising a combination of the base network address for web relay service 730, the web service descriptor for the particular web service 751, and the command to be performed by the particular web service 751. As an illustrative example, a possible destination address for a HTTP connection request may comprise:

https://webrelay.cloud.com/relay/myAPAC-PKI/fetch;
where:
https://webrelay.cloud.com/relay is the base network address for a web relay service;
myAPAC-PKI is the web service descriptor for the particular web service 751; and
fetch is the command to be performed by the particular web service 751.

As shown in the illustrative example above, a tenant-specific cloud service 711 may establish a connection with a web service named "myAPAC-PKI" and request a "fetch" command without the need to provide an internal network address of the web service (e.g., IP address, FQDN, or URL address) or the need to provide credential information needed to access the web service. In response to the request, the web relay service 730 may establish a connection with a corresponding web relay agent (e.g., 755a-755c) via a rendezvous support service 740. Once the connection is established, the tenant-specific cloud service 711 may communicate with the particular web service 751 (e.g., 751aa-751cn) and the web relay service 730 may forward the responses from the web service 751 to the tenant-specific cloud service 711.

In one or more arrangements, the connection request from the tenant-specific cloud service 711 to the multi-tenant web relay service 730 may comprise additional credential information for authenticating to the on-premises web service 751. For example, the connection request may comprise authenticating credentials provided by a user of the tenant-specific cloud service 711. The user may have provided the authenticating credentials to the tenant-specific cloud service 711 for authenticating to the on-premises web service 751 as that user. In another example, the tenant-specific cloud service 711 may have prompted the user for the authenticating credentials. As described in further detail below, the user authenticating credentials comprised by the connection request may be utilized to authenticate the connection request to the on-premises web service 751.

The computing environment 700 may include a multi-tenant web relay service 730. The web relay service 730 may be hosted on a single-server or multi-server system, or a cloud-based system, including at least one virtualization server, as described above with reference to FIG. 4. For example, web relay service 730 may be deployed using a cloud system, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others. Alternatively or additionally, web relay service 730 may be deployed on a plurality of servers for load-balancing and/or performance improvement purposes.

The multi-tenant web relay service 730 may serve as a proxy between a tenant-specific cloud service 711 and a web service 751. The multi-tenant web relay service 730 may receive connection requests from one or more tenant-specific cloud services 711. In response to receiving a connection request from a tenant-specific cloud service 711, the web relay service 730 may authenticate the connection request using credential information which may be comprised by the connection request. For example, a connection request may comprise a username and password combination which the web relay service 730 may use to authenticate the tenant-specific cloud service 711 transmitting the connection request. In another example, a connection request may comprise a tenant-specific signature using a private cryptographic key which the web relay service 730 may use to authenticate the tenant-specific cloud service 711 transmitting the connection request. If or when authentication fails, the web relay service 730 may prevent the tenant-specific cloud service 711 from establishing a connection with a web service 751. Alternatively or additionally, web relay service 730 may respond to the connection request with an indication that authentication failed or that access is denied. If or when, authentication is successful, web relay service 730 may determine which web relay agent 755 (e.g., 755a-755c) may be used to connect to the web service indicated in the connection request. The web relay service 730 may determine the particular web relay agent 755 with which to establish a connection based on the datacenter and web service information comprised by the connection request. Based on the determination, the web relay service 730 may create a communication channel to the determined web relay agent 755 via a rendezvous support service 740. Web relay service 730 may cache the communication channel for a predetermined amount of time (e.g., 10 minutes) such that a subsequent connection request to the same web relay agent 755 may re-use the pre-established communication channel. Web relay service 730 may also reformat the connection request prior to forwarding the connection request to the web relay agent 755 via the rendezvous support service 740. For example, web relay service 730 may encapsulate the received connection request into a byte-array and web relay service 730 may transmit the byte-array to the web relay agent 755. Web relay service 730 may remove one or more portions of the connection request and web relay service 730 may then transmit the stripped version of the connection request to the web relay agent 755. For example, web relay service 730 may remove the credential information used for authentication of the tenant-specific cloud service 711 by the web relay service 730 prior to forwarding the modified request to the web relay agent 755. Once a communication channel is established between web relay service 730 and web relay agent 755, the web relay service 730 may serve as a proxy by forwarding messages received from the web relay agent 755 to the tenant-specific cloud service 711 and forwarding messages received from the tenant-specific cloud service 711 to the web relay agent 755.

The computing environment 700 may include a rendezvous support service 740. The rendezvous support service 740 may be hosted on a single-server or multi-server system, or a cloud-based system, including at least one virtualization server, as described above with reference to FIG. 4. Rendezvous support service systems may alternatively be used, e.g., AZURE SERVICE BUS (provided by Microsoft Corporation of Redmond, Wash.), GOOGLE CLOUD MESSAGING (provided by Google, Inc. of Mountain View, Calif.), CITRIX CLOUD WEBSOCKETS (provided by Citrix Systems, Inc. of Fort Lauderdale, Fla.), or others. Alternatively or additionally, rendezvous support service 740 may be deployed on a plurality of servers for load-balancing and/or performance improvement purposes.

The rendezvous support service 740 may establish bidirectional communication channels between web relay service 730 and web relay agents 755. The rendezvous support service 740 may permit for such communication channels to be established in a manner that allows for bidirectional communication with network appliances which may sit behind a firewall, a gateway, a network address translation (NAT) device, or the like. The rendezvous support service 740 may allow each entity on each end of the communication channel to establish an outbound connection, e.g., an outbound TCP connection, which the rendezvous support service 740 may then maintain open and may use for establishing the bidirectional communication between the two entities.

Computing environment 700 may include one or more datacenters. For example, computing environment 700 may include one or more tenant datacenters, such as datacenter A 750a (which may, e.g., be a first datacenter owned by tenant A and located at a first internal on-premises geographic location), datacenter B 750b (which may, e.g., be a second datacenter owned by tenant A and located at a second internal on-premises geographic location, different from the first location), and datacenter C 750c (which may, e.g., be a third datacenter different from the first datacenter and the second datacenter and which may be owned by tenant B.) In one or more arrangements, one or more datacenters belonging to the same tenant may be geographically located at the same internal on-premises geographic location of the tenant. In such arrangements, the functions and features of the one or more datacenters may be combined to form a single datacenter for the particular tenant. Although FIG. 7 illustrates three datacenters 750 (i.e., 750a-750c), computing environment 700 may, in some instances, comprise any number of datacenters 750.

Each datacenter 750 may comprise a cloud connector 753 (e.g., 753a-753c). The cloud connector 753 may be hosted on a single-server or multi-server system, or a cloud-based system, including at least one virtualization server, as described above with reference to FIG. 4. Alternatively or additionally, cloud connector 753 may be deployed on a plurality of servers for load-balancing and/or performance improvement purposes. Cloud connector 753 may comprise a web relay agent 755 (e.g., 755a-755c) and web service descriptor definitions 757 (e.g., 757a-757c). A web relay agent 755 residing on a cloud connector 753 may communicate with the on-premises web services 751 (e.g., 751ac-751cn) on behalf of web relay service 730. The on-premises web services 751 may provide one or more web-based services which may be integrated with the cloud-based services provided by the cloud service provider 710 hosting the one or more tenant-specific cloud services 711. For example, tenant A cloud service 711a may augment the applications available via the application storefront by accessing a web service 751 (e.g., web services 751aa-751cn) which may publish additional applications that may be accessed by client devices 715a. In such a scenario, client devices 715a may seamlessly access applications hosted by cloud service provider 710 and by tenant A from within a single application storefront. In another example, on-premises web services 751 may provide public-key infrastructure (PKI) services for issuing certificates by an enterprise certificate authority which may be accessible only from within the enterprise internal network. In such a scenario, client devices 715 may obtain certificates issued by the enterprise certificate authority from outside of the enterprise internal network and via the tenant-specific cloud services 711.

The web relay agent 755 may establish the outbound connection to the rendezvous support service 740 that may result in a bidirectional communication channel with web relay service 730. For example, the outbound connection to the rendezvous support service 740 may comprise an outbound Transmission Control Protocol (TCP) connection. Web relay agent 755 may connect with on-premises web services 751 via a private internal network or some other communication network. The web relay agent 755 may authenticate to an on-premises web service 751 using locally-configured credential information which may be comprised by the web service descriptor definitions 757. For example, web relay agent 755 may use a username and password combination to authenticate with an on-premises web service 751. In another example, web relay agent 755 may use a client-side certificate to effectuate authentication with the on-premises web service 751. Alternatively or additionally, an on-premises web service 751 may require a custom authentication method. In such an arrangement, the tenant-specific cloud service 711 may provide the needed credential information along with the connection request.

Figure 9:
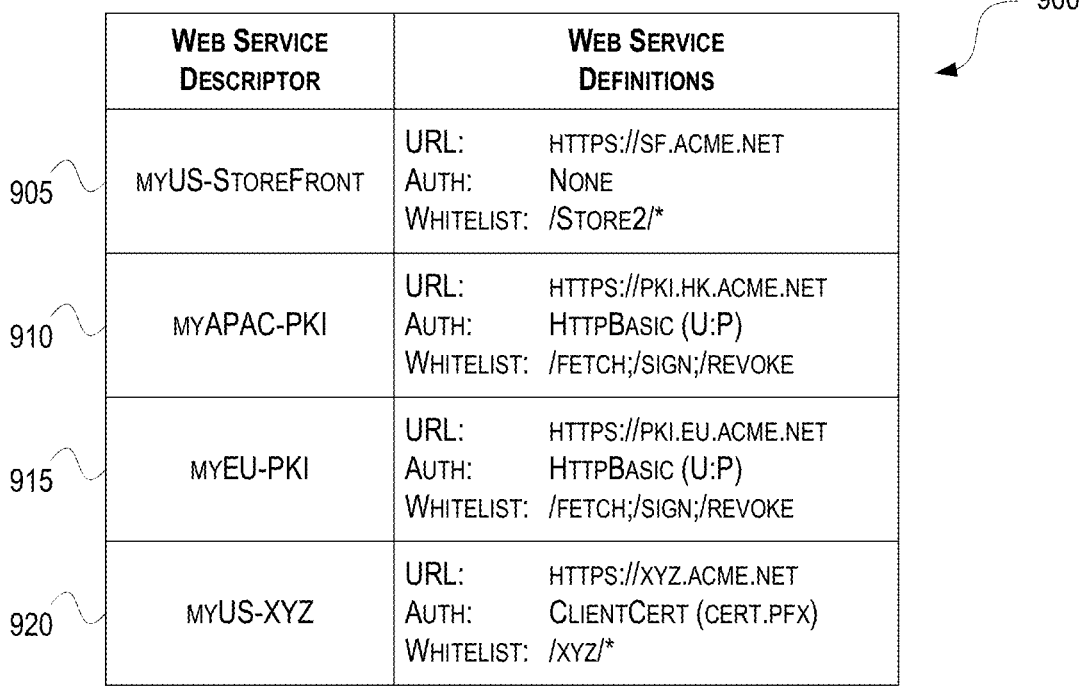
FIG. 9 depicts exemplary web service descriptor definitions that may be used in accordance with one or more illustrative aspects described herein.

The web service descriptor definitions 757 may comprise mapping information that the web relay service 730 may use to correlate a web service descriptor to an on-premises web service 751, as shown in FIG. 9. FIG. 9 illustrates exemplary web service descriptor definitions 900 which a cloud connector 753 may use to establish a connection with a particular on-premises web service 751. The web service descriptor definitions 757 may comprise, for each web service descriptor, a base internal network address for the on-premises web service, authentication credential information for the on-premises web service, and a whitelist listing of address paths relative to the base internal network address for the on-premises web service that may be accessed by the tenant-specific cloud services 711. The base internal network address for the on-premises web service may comprise a network address (e.g., IP address, FQDN, URL address, or the like) to identify and communicate with the on-premises web service 751. The authentication credential information for an on-premises web service 751 may comprise the type of authentication to use (e.g., none, HTTPBasic, client certificate, custom, or the like) and credential information which may be provided to the on premises web-service 751 to effectuate the authentication. The whitelist listing of address paths relative to the base internal network address for the on-premises web service that may be accessed by the tenant-specific cloud services 711 may comprise additional paths, relative to the base path, that the tenant-specific cloud services 711 may access. The listing may include wildcard characters to indicate multiple alternative paths within a single entry in the listing. For example, entry 905 may comprise web service definitions for a web service using the descriptor myUS-StoreFront with an internal network address of https://sf.acme.net, no authentication, and a whitelist of /Store2/*. In another example, entry 910 may comprise web service definitions for a web service using the descriptor myAPAC-PKI with an internal network address of https://pki.hk.acme.net, HTTPBasic authentication, and a whitelist comprising three entries, namely /fetch; /sign; /revoke. In another example, entry 915 may comprise web service definitions for a web service using the descriptor myEU-PKI with an internal network address of https://pki.eu.acme.net, HTTPBasic authentication, and a whitelist comprising three entries, namely /fetch; /sign; /revoke. In yet another example, entry 920 may comprise web service definitions for a web service using the descriptor myUS-XYZ with an internal network address of https://xyz.acme.net, ClientCert authentication, and a whitelist of /xyz/*. Although FIG. 9 illustrates four web service descriptor definitions 900 (i.e., 905-920), web service descriptor definitions 900 may, in some instances, comprise any number of web service descriptor entries. An administrator, or similarly authorized user in the tenant organization, may configure a cloud connector 753 to comprise web service descriptor definitions similar to web service descriptor definitions 900, and via an administration console (not shown), or the like. Advantageously, the web service descriptor definitions 757 may be configured by the tenant and the configuration information may reside within the tenant datacenter 750. The web relay service 730 and the tenant-specific cloud service 711 may not access the web service descriptor definitions 757 and may remain protected within a tenant's internal network and need not be disclosed or shared with the web relay service 730 or the tenant-specific cloud service 711.

Referring to FIG. 7, a web relay agent 755 may receive a connection request from tenant-specific cloud service 711 via rendezvous support service 740 and which may have been relayed by web relay service 730. In response to receipt of the connection request, the web relay agent 755 may look up the web service descriptor comprised by the connection request in web service descriptor definitions 757. The web relay agent 755 may retrieve the web service definitions 757 corresponding to the requested on-premises web service 751 comprised by the connection request. The web relay agent 755 may validate the web service command comprised by the connection request against the whitelist listing of address paths retrieved from the web service definitions 757. If or when the command or path attempted to be accessed is not permitted (i.e., it is not included in the whitelist listing), then the web relay agent 755 may respond to the connection request with an error message. If or when the command is permitted, then the web relay agent 755 may construct a message targeted to the network address of the requested on-premises web service 751. The message may comprise appropriate credential information which may have been retrieved from the web service definitions 757. The message may also comprise the requested command comprised by the connection request. The web relay agent 755 may then transmit the message to the requested on-premises web service 751 and await a response from the on-premises web service 751. In response to receiving a response to the message, the web relay agent 755 may relay the web service response to the web relay service 730 via the communication channel through the rendezvous support service 740. The web relay service 730 may then forward the web service response to the tenant-specific cloud service 711. Subsequent commands and requests from the tenant-specific cloud service 711 directed to the on-premises web service 751 may utilize the same path as the initial connection request, e.g., the subsequent commands and requests may be transmitted by the tenant-specific cloud service 711 to the web relay service 730, forwarded by the web relay service 730 via the rendezvous support service 740 to the web relay agent 755, and forwarded to the on-premises web service 751. In response to the subsequent commands and requests, web service may transmit a response. The response may be received by web relay agent 755 and relayed back to tenant-specific cloud service 711 via the web relay service 730 and the rendezvous support service 740.

Computing environment 700 also may include one or more networks, which may interconnect one or more of datacenters 750a-750c, rendezvous support service 740, multi-tenant web relay service 730, tenant-specific cloud services 711, and/or client computing devices 715. For example, computing environment 700 may include one or more private networks (e.g., one or more networks which may, e.g., be operated by and/or associated with an organization that operates one or more of datacenters 750a-750c and subscribed to the software services provided by a cloud service provider 710 and which may include one or more local area networks, wide area networks, virtual private networks, etc.) Computing environment 700 may also include a public network 720 which may, e.g., include the Internet and/or one or more other networks and which may interconnect one or more private networks and one or more computing devices connected thereto to one or more other computing devices not connected to such private networks.

Computing environment 700 may protect the integrity and confidentiality of the data transmissions between one or more of the computing environment components by establishing Secure Sockets Layer (SSL) sessions between the components. In one or more arrangements, the connections between the tenant-specific cloud service 711 and the web relay service 730, the connections between the web relay service 730 and the rendezvous support service 740, the connections between the rendezvous support service 740 and the web relay agent 755, as well as, the connections between the web relay agent 755 and the on-premises web service 751 may occur within SSL sessions. In some arrangements, each distinct connection or hop may comprise a separate SSL session. In other arrangements, the one or more connections or hops may share a single SSL session. In yet other arrangements, SSL sessions may be re-used to maximize performance.

Advantageously, and as illustrated in greater detail above, an enterprise or tenant organization may integrate internal on-premises web services with a tenant-specific cloud service hosted on a public cloud without the expense and complexity of a site-to-site Internet Protocol Security (IPsec) tunnel between the tenant's datacenter and the cloud-based service. In addition, the cloud service tenants are able to reduce their security exposure by not having to disclose or save confidential or private information, such as network addresses and authentication credentials, of their internal on-premises web services in publicly-accessible or shared cloud services. Furthermore, tenants may manage the security of the on-premises web services accessed by the tenant-specific cloud services by specifying which on-premises web services are accessible and which commands or functionality of each on-premises web service are accessible.

FIG. 7 illustrates one example of a system architecture that may be used, and in some instances, the specific system architecture and computing devices used may vary, and are secondary to the functionality that they provide, as further described herein. For example, services provided by the multi-tenant web relay service 730 and the rendezvous support service 740 may be combined into a single entity. Alternatively or additionally, one or more instances of web relay service 730 or the rendezvous support service 740 may be deployed across multiple geographic locations based on performance considerations.

Figure 10:
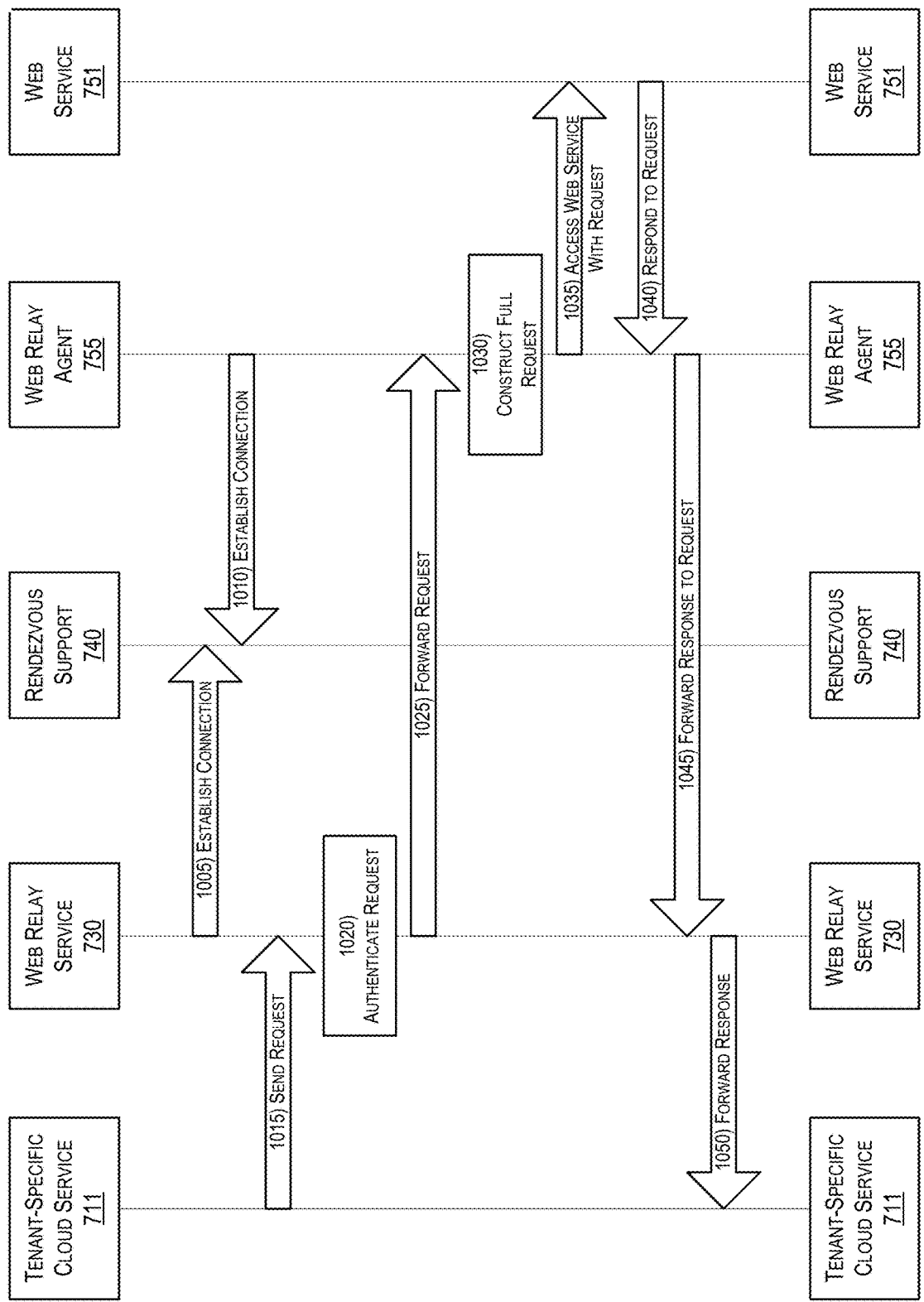
FIG. 10 depicts an example event sequence that illustrates a method of providing secure access to on-premises web services from multi-tenant cloud services using a multi-tenant web relay service, in accordance with one or more illustrative aspects described herein.

FIG. 10 depicts an example event sequence that illustrates a method of providing secure access to on-premises web services from multi-tenant cloud services using a multi-tenant web relay service, in accordance with one or more example embodiments. As seen in FIG. 10, one or more steps of the depicted example event sequence and other similar examples described herein may be performed in a computing environment such as the system illustrated in FIG. 7, as well as other systems having different architectures (e.g., all or part of FIGS. 1-6). In other embodiments, the method illustrated in FIG. 10 and/or one or more steps thereof may be embodied in a computer-readable medium, such as a non-transitory computer readable memory.

Referring to FIG. 10, step 1005, the web relay service 730 may establish an outbound connection to the rendezvous support service 740. For example, the outbound connection to the rendezvous support service 740 may comprise an outbound Transmission Control Protocol (TCP) connection. The outbound connection to the rendezvous support service 740 may result in a bidirectional communication channel with web relay agent 755.

At step 1010, web relay agent 755 may establish an outbound connection to the rendezvous support service 740. For example, the outbound connection to the rendezvous support service 740 may comprise an outbound Transmission Control Protocol (TCP) connection. The outbound connection to the rendezvous support service 740 may result in a bidirectional communication channel with web relay service 730.

At step 1015, tenant-specific cloud service 711 may send a connection request to web relay service 730 for a particular on-premises web service 751. The connection request from the tenant-specific cloud service 711 to the multi-tenant web relay service 730 may comprise credential information from tenant-specific information 713 for authenticating to the web relay service 730. The connection request may also comprise the name of the particular datacenter 750 where the particular on-premises web service 751 is hosted. The tenant-specific cloud service 711 may determine the name of the particular datacenter 750 using the mapping information 800 stored in the tenant-specific information 713. The connection request may also comprise the web service descriptor for the particular on-premises web service 751. The connection request may also comprise a command or action or request from the tenant-specific cloud service 711 to be performed by the particular web service 751.

At step 1020 and in response to receiving the connection request, web relay service 730 may authenticate the identity of the tenant transmitting the request. Authentication between the tenant-specific cloud service 711 and the web relay service 730 may be effectuated using one or more of known authentication mechanisms. The connection request from the tenant-specific cloud service 711 to the multi-tenant web relay service 730 may comprise credential information from tenant-specific information 713 for authenticating to the web relay service 730. In one or more arrangements, the connection request may comprise a username and password which the multi-tenant web relay service 730 may utilize to authenticate the connection request. In other arrangements, the connection request may comprise a signature using a per-tenant private key which the multi-tenant web relay service 730 may utilize to authenticate the connection request. If or when authentication fails, then the web relay service 730 may prevent the tenant-specific cloud service 711 from establishing a connection with a web service 751 and the method ends. Alternatively or additionally, web relay service 730 may respond to the connection request with an indication that authentication failed or that access is denied.

At step 1025, if or when the authentication is successful, then the web relay service may forward the connection request to web relay agent 755 via the bi-directional communication channel established via the rendezvous support service 740. Web relay service 730 may also reformat the connection request prior to forwarding the connection request to the web relay agent 755 via the rendezvous support service 740. For example, web relay service 730 may encapsulate the received connection request into a byte-array and web relay service 730 may transmit the byte-array to the web relay agent 755. Alternatively or additionally, web relay service 730 may remove one or more portions of the connection request and web relay service 730 may then transmit the stripped version of the connection request to the web relay agent 755. For example, web relay service 730 may remove the credential information used for authentication of the tenant-specific cloud service 711 by the web relay service 730 prior to forwarding the modified request to the web relay agent 755.

At step 1030 and in response to receiving the connection request from web relay service 730, the web relay agent 755 may look up the web service descriptor comprised by the connection request in web service descriptor definitions 757. The web relay agent 755 may retrieve the web service definitions 757 corresponding to the requested on-premises web service 751 using only the web service descriptor, or display-friendly name, of the on-premises web service 751 comprised by the connection request. For example, the connection request may comprise web service descriptor myAPAC-PKI which may cause web relay agent 755 to retrieve entry 910 from web service descriptor definitions 900. In such a scenario, web relay agent 755 may determine the base internal network address for the on-premises web service 751 to be https://pki.hk.acme.net.

The web relay agent 755 may validate the web service command comprised by the connection request against the whitelist listing of address paths retrieved from the web service definitions 757. Continuing the example described above, the connection request may comprise a "fetch" web service command. The web relay agent 755 may determine that the "fetch" web service command is a valid web service command because one of the entries in the whitelist listing of entry 910 from web service descriptor definitions 900 comprises that web service command. The web relay agent 755 may provide the web service command to the on-premises web service 751 as a partial address relative to a base address of the on-premises web service 751. If or when the command or path attempted to be accessed is not permitted (i.e., it is not included in the whitelist listing), then the web relay agent 755 may respond to the connection request with an error message and the method ends.

At step 1035, if or when the command is permitted, then the web relay agent 755 may construct a message targeted to the network address of the requested on-premises web service 751. The web relay agent 755 may determine the network address to the web service using the base address to the web service and the web service command as a partial address relative to the base address of the web service. Continuing the example described above, web relay agent 755 may determine the network address to the myAPAC-PKI web service to be "https://pki.hk.acme.net/fetch". The message may comprise appropriate credential information which may have been retrieved from the web service definitions 757. For example, web relay agent 755 may utilize HttpBasic authentication to connect to the myAPAC-PKI web service as indicated by entry 910 from web service descriptor definitions 900. In such a scenario, the message to the myAPAC-PKI web service may comprise the username and password comprised by entry 910 from web service descriptor definitions 900.

Alternatively or additionally, the connection request may comprise additional authenticating credentials for authenticate the connection request to the on-premises web service 751. The web relay agent 755 may include the additional authenticating credentials, if available, in the message to the on-premises web service 751. The web relay agent 755 may then transmit the message to the requested on-premises web service 751.

At step 1040, and in response to receiving a connection request from web relay agent 755, on-premises web service 751 may transmit to web relay agent 755 a response to the connection request. At step 1045 and in response to receiving a response to the connection request from on-premises web service 751, web relay agent 755 may relay the on-premises web service response to web relay service 730 via the bi-directional communication channel using the rendezvous support service 740. At step 1050 and in response to receiving the forwarded response to the connection request from web relay agent 755, web relay service 730 may forward the response to the connection request from on-premises web service 751 to tenant-specific cloud service 711.

The method illustrated in FIG. 10 may be utilized by a tenant-specific cloud service 711 to establish a secure bidirectional communication channel to the tenant's on-premises web service 751 hosted by a particular tenant datacenter 750. Advantageously, and as illustrated in greater detail above, the secure bidirectional communication channel may be established without the expense and complexity of a site-to-site Internet Protocol Security (IPsec) tunnel between the tenant datacenter 750 and the tenant-specific cloud service 711. In addition, the tenant-specific cloud service 711 may not require confidential or private information, such as network addresses and authentication credentials, for the on-premises web service 751. Furthermore, the tenant-specific cloud service 711 may integrate the functionality and features provided by the on-premises web service 751 using the secure bidirectional communication channel.

Figure 11:
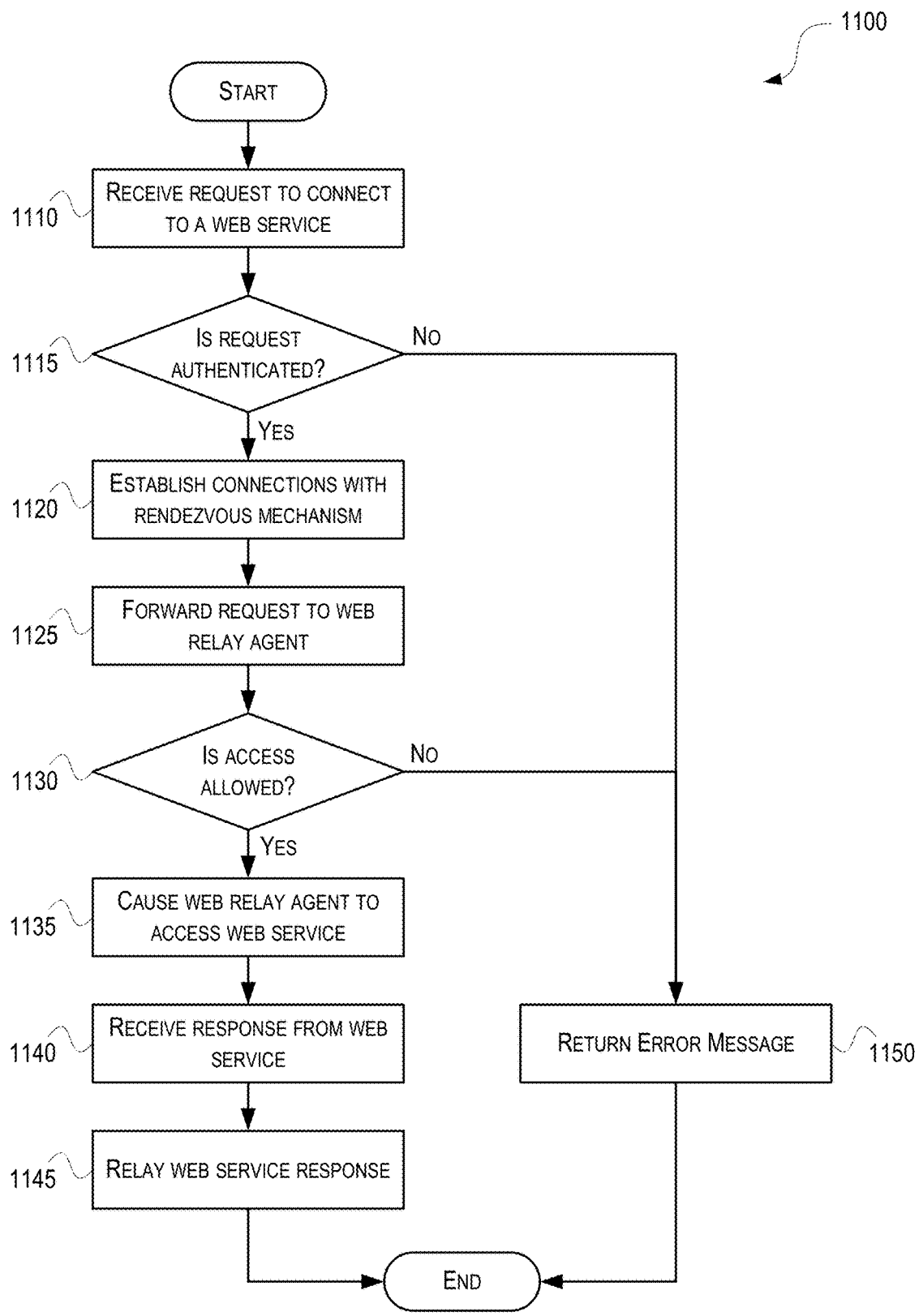
FIG. 11 depicts a flowchart that illustrates a method of providing secure access to on-premises web services from multi-tenant cloud services using a multi-tenant web relay service, in accordance with one or more example embodiments.

FIG. 11 depicts a flowchart that illustrates a method of providing secure access to on-premises web services from multi-tenant cloud services using a multi-tenant web relay service, in accordance with one or more example embodiments. As seen in FIG. 11, one or more steps of the depicted example event sequence and other similar examples described herein may be performed in a computing environment such as the system illustrated in FIG. 7, as well as other systems having different architectures (e.g., all or part of FIGS. 1-6). In other embodiments, the method illustrated in FIG. 11 and/or one or more steps thereof may be embodied in a computer-readable medium, such as a non-transitory computer readable memory.

Referring to FIG. 11, at step 1110, multi-tenant web relay service 730 may receive from a tenant-specific cloud service 711 a request to connect to an on-premises web services 751 hosted within a tenant datacenter 750. In some embodiments, the connection request may comprise a HyperText Transfer Protocol (HTTP) request. In such embodiments, the connection request may comprise a HTTP header with credential information (e.g., username and password, or signature using a per-tenant private key) which the web relay service 730 may use to authenticate the tenant-specific cloud service 711 transmitting the request. The connection request may also comprise the name of the particular datacenter 750 where the particular web service 751 is hosted. The tenant-specific cloud service 711 may determine the name of the particular datacenter 750 using the mapping information 800 stored in the tenant-specific information 713. For example, a HTTP connection request may comprise a HTTP header with the name of the datacenter. The connection request may also comprise the web service descriptor for the particular web service 751. The web service descriptor may be a display-friendly name that may be used to refer to a specific instance of an on-premises web service. Advantageously, the web service descriptor may be used in lieu of using a network address (e.g., IP address, FQDN, URL address, or the like) to identify the web service. The tenant-specific cloud service 711 may determine the web service descriptor for the particular web service 751 using the mapping information 800 stored in the tenant-specific information 713. The connection request may also comprise a command or action or request from the tenant-specific cloud service 711 to be performed by the particular web service 751. For example, a HTTP connection request may comprise a destination address comprising a combination of the base network address for web relay service 730, the web service descriptor for the particular web service 751, and the command to be performed by the particular web service 751.

At step 1115 and in response to receiving the connection request, multi-tenant web relay service 730 may authenticate the connection request using the credential information comprised by the connection request. If or when the authentication fails, the method may proceed to step 1150. At step 1150, the web relay service 730 may return an error message and the method ends. However, if or when authentication is successful, web relay service 730 may establish a connection with rendezvous support service 740, as shown at step 1120. The connection may comprise an outbound Transmission Control Protocol (TCP) connection. Similarly, web relay agent 755 may also establish a connection with rendezvous support service 740 at step 1120. The second connection may also comprise an outbound Transmission Control Protocol (TCP) connection.

At step 1125, web relay service 730 may transmit the connection request to the web relay agent 755 via the rendezvous support service 740. Web relay service 730 may also reformat the connection request prior to forwarding the connection request to the web relay agent 755 via the rendezvous support service 740. For example, web relay service 730 may encapsulate the received connection request into a byte-array and web relay service 730 may transmit the byte-array to the web relay agent 755. Web relay service 730 may remove one or more portions of the connection request and web relay service 730 may then transmit the stripped version of the connection request to the web relay agent 755. For example, web relay service 730 may remove the credential information used for authentication of the tenant-specific cloud service 711 by the web relay service 730 prior to forwarding the modified request to the web relay agent 755.

At step 1130 and in response to receiving the connection request from web relay service 730, the web relay agent 755 may determine whether access to the requested on-premises web service is allowed. The web relay agent 755 may retrieve the web service definitions 757 corresponding to the requested on-premises web service 751 comprised by the connection request. The web relay agent 755 may validate the web service command comprised by the connection request against the whitelist listing of address paths retrieved from the web service definitions 757. If or when the command or path attempted to be accessed is not permitted (i.e., it is not included in the whitelist listing), then the method may proceed to step 1150 and end.

As shown at step 1135, if or when access is allowed, then the web relay agent 755 may construct a message targeted to the network address of the requested on-premises web service 751. The message may comprise appropriate credential information which may have been retrieved from the web service definitions 757. The message may also comprise the requested command comprised by the connection request. The web relay agent 755 may then transmit the message to the requested on-premises web service 751.

At step 1140, and in response to receiving a connection request from web relay agent 755, on-premises web service 751 may transmit to web relay agent 755 a response to the connection request. At step 1145, and in response to receiving a response to the connection request from on-premises web service 751, web relay agent 755 may relay the on-premises web service response to web relay service 730 via the bi-directional communication channel using the rendezvous support service 740 and the web relay service 730 may forward the on-premises web service response to tenant-specific cloud service 711 and the method ends.

The tenant-specific cloud service 711 may transmit additional requests to multi-tenant web relay service 730 directed to the on-premises web service 751. The multi-tenant web relay service 730 may forward the additional requests to web relay agent 755 via rendezvous support service 740. As described above in reference to steps 1140 and 1145, web relay agent 755 may transmit the additional requests to on-premises web service 751 and relay the responses from on-premises web service 751 back to tenant-specific cloud service 711 via the bi-directional communication channel using the rendezvous support service 740 and the web relay service 730.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a multi-tenant web relay service and from a tenant-specific cloud service, a Hypertext Transfer Protocol (HTTP) request to connect to a web service hosted within a tenant datacenter, wherein the HTTP request comprises: data indicating a display-friendly name of the web service, data identifying the tenant datacenter, and a tenant-specific signature generated by the tenant-specific cloud service using a tenant-specific private key for authenticating the tenant-specific cloud service to the multi-tenant web relay service;
   responsive to receiving the HTTP request from the tenant-specific cloud service, authenticating, by the multi-tenant web relay service, the HTTP request using the tenant-specific signature generated by the tenant-specific cloud service using the tenant-specific private key;
   responsive to authenticating the HTTP request, establishing, by the multi-tenant web relay service, and via a rendezvous support service, a communication channel with a web relay agent, wherein the web relay agent is located at the tenant datacenter;
   creating, by the multi-tenant web relay service, a modified HTTP request, wherein creating the modified HTTP request comprises removing the tenant-specific signature generated by the tenant-specific cloud service using the tenant-specific private key from the HTTP request received from the tenant-specific cloud service;
   forwarding, by the multi-tenant web relay service and to the web relay agent, the modified HTTP request via the communication channel;
   causing, by the multi-tenant web relay service, the web relay agent to access the web service hosted within the tenant datacenter based on the display-friendly name of the web service, wherein causing the web relay agent to access the web service hosted within the tenant datacenter based on the display-friendly name of the web service comprises:
      causing the web relay agent to determine a service-account credential using only the display-friendly name of the web service; and
      causing the web relay agent to authenticate to the web service with the service-account credential;
   receiving, by the multi-tenant web relay service and from the web relay agent, a response to the modified HTTP request; and
   relaying, by the multi-tenant web relay service and to the tenant-specific cloud service, the received response to the modified HTTP request.

2. The method of claim 1,
   wherein authenticating the HTTP request using the tenant-specific signature generated by the tenant-specific cloud service using the tenant-specific private key comprises authenticating, by the multi-tenant web relay service, that the HTTP request received from the tenant-specific cloud service comes from a valid tenant that is authorized to connect to the tenant datacenter using only the tenant-specific signature generated by the tenant-specific cloud service using the tenant-specific private key.

3. The method of claim 1,
   wherein the web service hosted within the tenant datacenter comprises an on-premises Public Key Infrastructure (PKI) service; and
   wherein the response to the modified HTTP request comprises an end-user certificate.

4. The method of claim 1,
   wherein the web service hosted within the tenant datacenter comprises an enterprise storefront service; and
   wherein the response to the modified HTTP request comprises a listing indicative of applications available on the enterprise storefront service.

5. The method of claim 1,
   wherein the causing the web relay agent to access the web service comprises:
      causing the web relay agent to authenticate to the web service using only the service-account credential.

6. The method of claim 1,
   wherein the HTTP request received from the tenant-specific cloud service comprises a partial address relative to a base address of the web service; and
   wherein the causing the web relay agent to access the web service comprises:
      causing the web relay agent to determine the base address to the web service using only the display-friendly name of the web service; and
      causing the web relay agent to determine a network address to the web service using the base address to the web service and the partial address relative to the base address of the web service.

7. The method of claim 1,
wherein creating the modified HTTP request comprises encapsulating the HTTP request received from the tenant-specific cloud service into a byte-array, and
wherein forwarding the modified HTTP request via the communication channel comprises transmitting the byte-array to the web relay agent.

8. A system comprising:
a web relay agent, located at a tenant datacenter, configured to receive HTTP requests directed to a web service hosted within the tenant datacenter and configured to transmit responses to the HTTP requests; and
a multi-tenant web relay service configured to:
  receive, from a tenant-specific cloud service, a Hypertext Transfer Protocol (HTTP) request to connect to the web service, wherein the HTTP request comprises: data indicating a display-friendly name of the web service, data identifying the tenant datacenter, and a tenant-specific signature generated by the tenant-specific cloud service using a tenant-specific private key for authenticating the tenant-specific cloud service to the multi-tenant web relay service;
  responsive to receiving the HTTP request from the tenant-specific cloud service, authenticate the HTTP request using the tenant-specific signature generated by the tenant-specific cloud service using the tenant-specific private key;
  responsive to authenticating the HTTP request, establish, via a rendezvous support service, a communication channel with the web relay agent;
  create a modified HTTP request, wherein creating the modified HTTP request comprises removing the tenant-specific signature generated by the tenant-specific cloud service using the tenant-specific private key from the HTTP request received from the tenant-specific cloud service;
  forward, to the web relay agent, the modified HTTP request via the communication channel;
  cause the web relay agent to access the web service hosted within the tenant datacenter based on the display-friendly name of the web service, wherein causing the web relay agent to access the web service hosted within the tenant datacenter based on the display-friendly name of the web service comprises:
    causing the web relay agent to determine a service-account credential using only the display-friendly name of the web service; and
    causing the web relay agent to authenticate to the web service with the service-account credential;
  receive, from the web relay agent, a response to the modified HTTP request; and
  relay, to the tenant-specific cloud service, the received response to the modified HTTP request.

9. The system of claim 8,
wherein authenticating the HTTP request using the tenant-specific signature generated by the tenant-specific cloud service using the tenant-specific private key comprises authenticating that the HTTP request received from the tenant-specific cloud service comes from a valid tenant that is authorized to connect to the tenant datacenter using only the tenant-specific signature generated by the tenant-specific cloud service using the tenant-specific private key.

10. The system of claim 8,
wherein the web service hosted within the tenant datacenter comprises an on-premises Public Key Infrastructure (PKI) service; and
wherein the response to the modified HTTP request comprises an end-user certificate.

11. The system of claim 8,
wherein the web service hosted within the tenant datacenter comprises an enterprise storefront service; and
wherein the response to the modified HTTP request comprises a listing indicative of applications available on the enterprise storefront service.

12. The system of claim 8,
wherein the causing the web relay agent to access the web service comprises:
  causing the web relay agent to authenticate to the web service using only the service-account credential.

13. The system of claim 8,
wherein the HTTP request received from the tenant-specific cloud service comprises a partial address relative to a base address of the web service; and
wherein the causing the web relay agent to access the web service comprises:
  causing the web relay agent to determine the base address to the web service using only the display-friendly name of the web service; and
  causing the web relay agent to determine a network address to the web service using the base address to the web service and the partial address relative to the base address of the web service.

14. The system of claim 8,
wherein creating the modified HTTP request comprises encapsulating the HTTP request received from the tenant-specific cloud service into a byte-array, and
wherein forwarding the modified HTTP request via the communication channel comprises transmitting the byte-array to the web relay agent.

15. One or more non-transitory computer readable media storing computer readable instructions that, when executed by an apparatus, cause the apparatus to:
  receive, by a multi-tenant web relay service and from a tenant-specific cloud service, a Hypertext Transfer Protocol (HTTP) request to connect to a web service hosted within a tenant datacenter, wherein the HTTP request comprises: data indicating a display-friendly name of the web service, data identifying the tenant datacenter, and a tenant-specific signature generated by the tenant-specific cloud service using a tenant-specific private key for authenticating the tenant-specific cloud service to the multi-tenant web relay service;
  responsive to receiving the HTTP request from the tenant-specific cloud service, authenticate, by the multi-tenant web relay service, the HTTP request using the tenant-specific signature generated by the tenant-specific cloud service using the tenant-specific private key;
  responsive to authenticating the HTTP request, establish, by the multi-tenant web relay service, and via a rendezvous support service, a communication channel with a web relay agent, wherein the web relay agent is located at the tenant datacenter;
  create, by the multi-tenant web relay service, a modified HTTP request, wherein creating the modified HTTP request comprises removing the tenant-specific signature generated by the tenant-specific cloud service using the tenant-specific private key from the HTTP request received from the tenant-specific cloud service;

forward, by the multi-tenant web relay service and to the web relay agent, the modified HTTP request via the communication channel;

cause, by the multi-tenant web relay service, the web relay agent to access the web service hosted within the tenant datacenter based on the display-friendly name of the web service, wherein causing the web relay agent to access the web service hosted within the tenant datacenter based on the display-friendly name of the web service comprises:

causing the web relay agent to determine a service-account credential using only the display-friendly name of the web service; and causing the web relay agent to authenticate to the web service with the service-account credential;

receive, by the multi-tenant web relay service and from the web relay agent, a response to the modified HTTP request; and relay, by the multi-tenant web relay service and to the tenant-specific cloud service, the received response to the modified HTTP request.

16. The one or more non-transitory computer readable media of claim 15, wherein authenticating the HTTP request using the tenant-specific signature generated by the tenant-specific cloud service using the tenant-specific private key comprises authenticating, by the multi-tenant web relay service, that the HTTP request received from the tenant-specific cloud service comes from a valid tenant that is authorized to connect to the tenant datacenter using only the tenant-specific signature generated by the tenant-specific cloud service using the tenant-specific private key.

17. The one or more non-transitory computer readable media of claim 15, wherein the web service hosted within the tenant datacenter comprises an on-premises Public Key Infrastructure (PKI) service; and wherein the response to the modified HTTP request comprises an end-user certificate.

18. The one or more non-transitory computer readable media of claim 15, wherein the web service hosted within the tenant datacenter comprises an enterprise storefront service; and wherein the response to the modified HTTP request comprises a listing indicative of applications available on the enterprise storefront service.

19. The one or more non-transitory computer readable media of claim 15, wherein the HTTP request received from the tenant-specific cloud service comprises a partial address relative to a base address of the web service; and wherein the causing the web relay agent to access the web service comprises:

causing the web relay agent to determine the base address to the web service using only the display-friendly name of the web service; and causing the web relay agent to determine a network address to the web service using the base address to the web service and the partial address relative to the base address of the web service.

20. The one or more non-transitory computer readable media of claim 15, wherein the causing the web relay agent to access the web service comprises:

causing the web relay agent to authenticate to the web service using only the service-account credential.

21. The one or more non-transitory computer readable media of claim 15, wherein creating the modified HTTP request comprises encapsulating the HTTP request received from the tenant-specific cloud service into a byte-array, and wherein forwarding the modified HTTP request via the communication channel comprises transmitting the byte-array to the web relay agent.

\* \* \* \* \*